United States Patent [19]

Lipner et al.

[11] Patent Number: 5,210,795
[45] Date of Patent: May 11, 1993

[54] SECURE USER AUTHENTICATION FROM PERSONAL COMPUTER

[75] Inventors: Steven B. Lipner, Wellesley; Morrie Gasser, Saugus; Butler W. Lampson, Cambridge, all of Mass.

[73] Assignee: Digital Equipment Corporation, Maynard, Mass.

[21] Appl. No.: 818,855

[22] Filed: Jan. 10, 1992

[51] Int. Cl.$^5$ ............................................. H04K 1/00
[52] U.S. Cl. ......................................... 380/23; 380/4; 380/25; 395/725
[58] Field of Search ..................... 380/3, 4, 21, 22, 23, 380/24, 25, 28, 30; 395/425, 725; 364/975.2, 976

[56] References Cited

U.S. PATENT DOCUMENTS

| | | |
|---|---|---|
| 4,309,569 | 1/1982 | Merkle . |
| 4,405,829 | 9/1983 | Rivest et al. . |
| 4,757,533 | 7/1988 | Allen et al. .................... 380/23 X |
| 4,771,459 | 9/1988 | Jansen . |
| 4,779,224 | 10/1988 | Moseley et al. . |
| 4,796,181 | 1/1989 | Wiedemer ........................ 380/4 X |
| 4,799,258 | 1/1989 | Davies ............................. 380/21 |
| 4,887,077 | 12/1989 | Irby, III et al. . |
| 4,975,950 | 12/1990 | Lentz ............................. 380/4 |
| 5,005,200 | 4/1991 | Fischer ............................ 380/30 |
| 5,016,274 | 5/1991 | Micali et al. ................... 380/23 |
| 5,018,196 | 5/1991 | Takaragi et al. ................ 380/30 |

OTHER PUBLICATIONS

Schroeder, Birrell & Needham, Experience with Grapevine: The Growth of a Distributed System, 2 ACM Transactions on Computer Systems 3–23 (1984).

Miller, Neuman, Schiller & Saltzer, Kerberos Authentication and Authorization System, Project Athena Technical Plan (1987).

European Community Manufactures Association (ECMA), Security in Open Systems–Data Elements and Service Definitions: "Alice in Wonderland" (Jul. 1989).

ECMA, Security in Open Systems—A Security Framework, ECMA TR/46 (1988).

The Digital Distributed System Security Architecture, (1989).

*Primary Examiner*—Tod R. Swann
*Attorney, Agent, or Firm*—Arnold, White & Durkee

[57] ABSTRACT

A method and apparatus for authenticating a human user on a personal computer without requiring the user to expose his password or authentication secret to the personal computer of a server. Also a method for protecting a floppy disk with login software from unauthorized use.

14 Claims, 2 Drawing Sheets

SECURE USER AUTHENTICATION FROM PERSONAL COMPUTER

TABLE OF CONTENTS

1. Background of the Invention
   1.1 Field of the Invention
   1.2 User Authentication
   1.2(a) Password Authentication
   1.2(b) Authentication via RSA Cryptography plus Global Naming Service
   1.3 Authentication on Personal Computers
2. Summary of the Invention
3. Brief Description of the Drawings
4. Detailed Description of Specific
   4.1 Security-Device Floppy Disk
   4.2 The Login Procedure of the Present Invention
   4.2(a) Booting the Authentication Software
   4.2(b) Entry of the User's Password
   4.2(c) Determination of Write-Protection
   4.2(d) Verification of the Personal Computer's Internal Clock
   4.2(e) Authentication of the Personal Computer's Operating System
   4.2(f) Verification of the User's Password
   4.2(g) Generation of Session Keys and Delegation Certificate
   4.2(h) Alternate Embodiments
   4.3 Protection of the User's Floppy Disk from Theft
   4.3(a) Copy Protection of the Encrypted Long Term Secret
   4.3(b) The Use of the Slow Hash
   4.3(c) Maintaining a Password Failure Count
5. Claims
6. Abstracts

1. BACKGROUND OF THE INVENTION

1.1 Field of the Invention

The present invention relates to secure user authentication from a personal computer and, more particularly, to a method and apparatus for authenticating a user on a personal computer without requiring the user to expose his password or authentication secret to any software processes on the personal computer.

1.2 User Authentication

In order to implement a security policy controlling the exchange of information through a personal computer or throughout a computing system, some mechanism should exist for uniquely identifying each user of the network systems. Only in this manner can the access rights of each system user be determined and controlled. This process of identifying and verifying a "principal" (e.g., a user) on the network, is known as "authentication."

1.2(a) Password Authentication

One method for authenticating a user is through the use of a secret password. Under this method, each system user is given a secret password and it is assumed that only that user has access to the password. A list is then maintained in memory in the personal computer or computing system's memory that matches each user with his password. To authenticate a user under this method, a process running on the personal computer or in the computer system generally prompts the user to type in his user name and password. If the entered password matches the stored password for that user, the process concludes that the user is who he says he is and allows the user to login to the personal computer or the computing system. In other words, the entry of a correct password "authenticates" the user.

1.2(b) Authentication via RSA Cryptography plus Global Naming service

Another method for authenticating users on a computing system or a personal computer is through the use of RSA cryptography and a global naming service. RSA cryptography, disclosed in U.S. Pat. No. 4,405,829 to Rivest et al., is well known in the art. RSA cryptography involves the use of a public/private key system. Basically, each principal that may use the personal computer or access the computing system is assigned a particular "private key". This private key is a code that is exclusive to that principal; it is not disclosed to any other principal on the network. Thus, for security purposes, it is assumed that each private key is kept secret by its principal.

Corresponding to each private key is a public key. A public key is associated with each principal who can use the personal computer or access the computing network. This public key may be made known and shared with other principals who may use the personal computer or access the computing network.

As known in the art, the public and private keys are generated in such a manner that knowledge of the public key does not reveal the private key.

The public and private keys operate together to allow the coding and decoding of messages. Thus, a message encoded using a private key may only be decoded by the public key that corresponds to that private key. Alternately, a message encoded using a public key may only be decoded by the private key corresponding to that public key.

Additional discussion of public and private key encryption may be found in copending applications U.S. Ser. Nos. 589,923, 589,924, 589,925 and 589,926, all assigned to the assignee of the present invention.

1.3 Authentication on Personal Computers

The case of authenticating a human user is special in that the human user does not have direct control over a RSA private key. That control must rest in some piece of hardware or software that the user can trust. Because of this, the use of the above described authentication processes to authenticate human users continues to rely on the use of a password.

To make use of RSA public key cryptography for user authentication, the user's RSA private key is commonly stored in either a global naming service or in some other readily accessible place, encrypted under a secret mathematically derived from the user's password. This encryption uses any well-known symmetric key copytographic algorithm (such as DES). Encryption of the private key prevents the key from being known to a system that does not know the password. Any of a number of well-known hash algorithms can be used to convert a password into a secret key.

Thus, the login process involves the user typing his password into the PC, the PC hashing the password to form a secret key, the PC fetching the user's encrypted RSA private key (from a naming service or local database), and the PC decrypting the encrypted RSA private key. As a result, the PC now has the user's RSA private key and can use that private key to authenticate that user to a remote system.

The basic problem with this authentication method is that it requires the user to trust the software running on the personal computer with his password. Thus, the user must place extreme confidence in the fact that the process prompting him for his password has not been infiltrated with a trojan horse or a virus. Unfortunately, it is relatively simple for a malicious user or process to mimic the prompting procedures of a valid authentication process. Thus, it is possible with any traditional password-based methods for a malicious process to trick a user into providing it with his password, compromising the user's password and hence the RSA private key (or authentication secret) encrypted under that password.

2. Summary of the Invention

A personal security device in accordance with the present invention decreases the chance that malicious software running on a personal computer will compromise a user's password and authentication secret. The device takes the form of a special floppy disk unique to a user. This floppy disk contains the user's private key encrypted under the user's password and a trusted login program. To authenticate himself on a personal computer, the user need only boot the personal computer with his floppy disk and provide the information requested of him by the trusted login program. In this manner security is increased since the user need not trust any operating system software on the personal computer. The user need only trust the personal computer hardware the built-in software (e.g., ROM BIOS), and the software on the floppy disk. Additionally, the security device helps the user verify that the operating system to be booted on his personal computer (e.g., from a hard disk) is valid.

Further, the security device provides an authentication floppy where it is difficult to extract the long term secret from the floppy by guessing the correct password.

3. BRIEF DESCRIPTION OF THE DRAWINGS

4. DETAILED DESCRIPTION OF SPECIFIC EMBODIMENTS

4.1 Security-Device Floppy Disk

Each human user who is authorized to log onto a personal computer or log into a computer system through a personal computer may be provided with a floppy disk containing a machine readable representation of the following data:

(a) the user's long term secret (private key) encrypted under a key consisting of a "slow hash" of a password known only to the user;

(b) the public key of the user's certifying authority;

(c) the time of the user's last login;

(d) the number of incorrect passwords entered;

(e) a first machine executable trusted program that can carry out cryptographic calculations and authentications;

(f) a second machine executable trusted program that can carry out a slow hash of a password and a trusted message digest program; and (g) optionally, a list of names and message digests of acceptable operating system images with which the user is willing to boot his personal computer.

Figure 1:
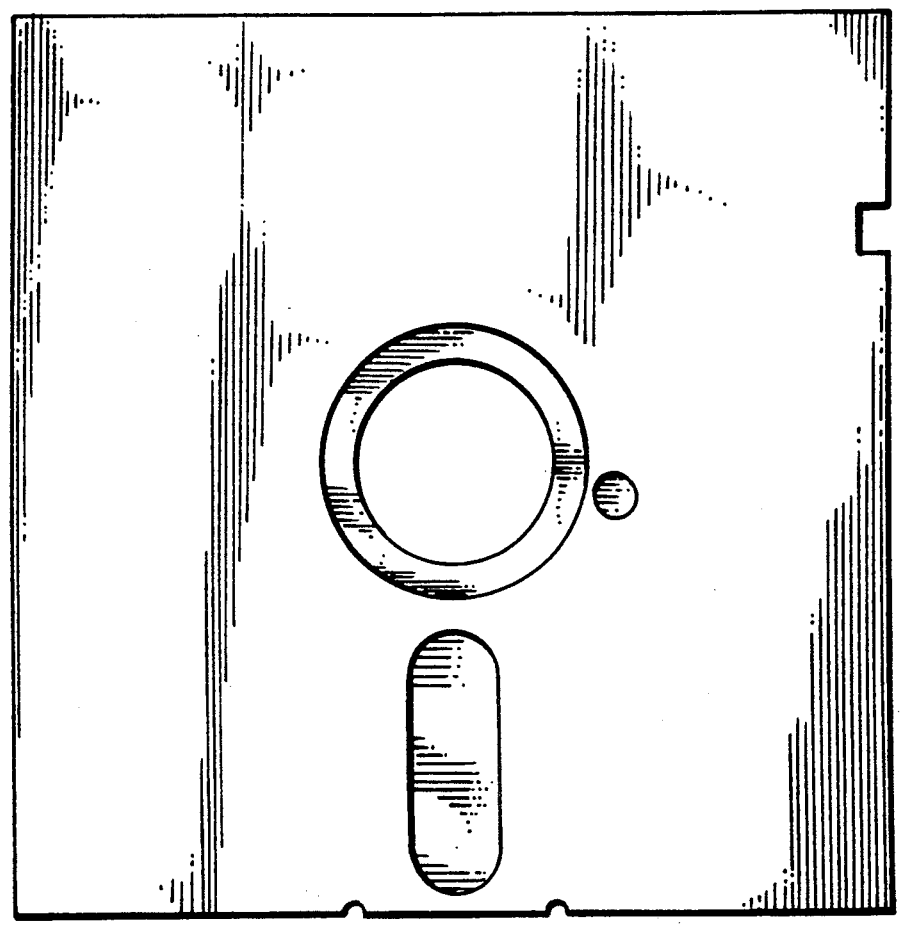
FIG. 1 illustrates a security-device floppy disk in accordance with the present invention.

As discussed below, this floppy disk is used to authenticate the user on a personal computer. An illustration of the security-device floppy disk is provided in FIG. 1. As used in this disclosure, the term "floppy disk" should be read to cover any machine-readable medium tangibly embodying the data describe above.

4.2 The Login Procedure of the Present Invention

Figure 2:
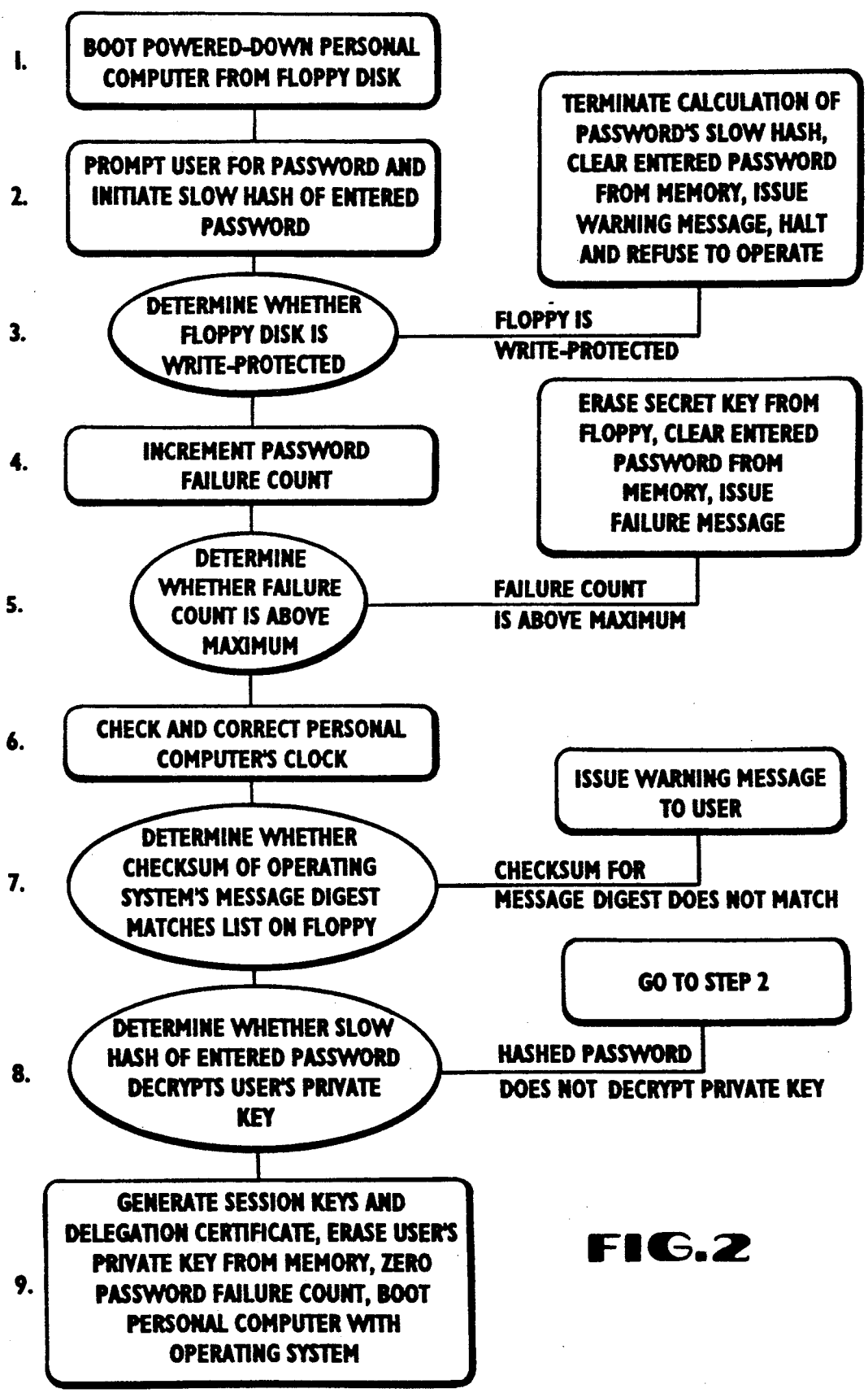
FIG. 2 illustrates the steps of a method in accordance with the present invention.

The login procedure using the floppy disk of the present invention is set out below. This procedure is illustrated in FIG. 2.

4.2(a) Booting the Authentication Software

In practice, the user inserts the floppy disk into a powered down personal computer and powers up the personal computer. On certain personal computers the user will have to depress the boot button after powering on the personal computer. Once powered on, the personal computer then boots from the user's floppy disk using any convenient boot-up routine.

It is important at this step to note that the user should preferably insert the floppy disk into a powered down personal computer. If the personal computer is running at the time the floppy disk is inserted, a danger exists that malicious software running on the personal computer could attack the user's floppy disk. By inserting the disk into a powered down personal computer, the risk of software attacks are reduced.

4.2(b) Entry of the User's Password

Once the personal computer has booted from the user's floppy disk, the first trusted login program on the floppy disk executes and prompts the user for his password. Once the user enters his password, the second trusted program initiates, possibly in the background, a task to calculate a "slow" one-way hash of the user's password; the hash should be slow enough in execution to limit the password-guessing attack on a stolen floppy, as discussed in 4.3(b). A slow one-way hash as used in this disclosure is any hash algorithm complex enough to require significant computational power. One method for obtaining a slow one-way hash of an entered password is to use multiple passes of DES over the password, each time using the output of the previous pass as the key for the next pass. Both of these trusted programs may be conventionally implemented in any convenient manner.

4.2(c) Determination of Write-Protection

While calculating the slow hash of the entered password, the login software conventionally determines whether the floppy disk in the active disk drive is write protected. If it is write protected, the software terminates the calculation of the slow hash, clears the entered password from memory, and halts with a warning message, refusing to operate. This step is desirable since no valid user floppy disks will be write protected and any attempted authentication process with a write-protected disk would indicate suspicious activity.

If the login software determines that the disk in the active drive is writable, the software reads and increments the "password failure count" on the disk. If the incremented count exceeds a certain number, for example 10, the login software erases the user's encrypted private key from the disk, clears the entered password from memory, tells the user that the password failure limit has been exceeded, and tells him that he must reinitialize his disk. This step is desirable to prevent a malicious user from taking another user's floppy disk and attempting to login to the personal computer as the innocent user. Once the user's private key has been erased from the disk, it is impossible to login to a personal computer with that disk, and the disk must be reinitialized (i.e., provided with another private key encrypted by a valid password) before a successful login with that disk can be completed.

4.2(d) Verification of the Personal Computer's Internal Clock

After incrementing the password failure count, the login software then checks the personal computer's internal clock for the date and time and compares that time to the date and time of the "last login" as stored on the user's floppy disk. If the internal time is less than that on the floppy disk, the login software issues an error message suggesting that the user set the personal computer's clock to the correct value. If the clock is greater than the time stored on the floppy by greater than a preselected amount, for example three (3) days, the login software displays the personal computer clock time and asks the user if it is approximately correct. If user responds "no" the login software tells the user to set the time on the personal computer correctly. If the user answers "yes", or if the time is within three days, the time is assumed to be correct and the personal computer's time is written onto the floppy as the new value for "time of last login." The purpose of this clock check is to assure that the expiration time to be included in the delegation certificate created in 4.2(g) below is correct.

4.2(e) Authentication of the Personal Computer's Operating system

In one embodiment of the present invention, after updating the time of last login, the login software examines the portion of the hard disk or other storage device to be booted as the operating system of the personal computer after authentication is completed. The login software calculates a message digest (i.e., a one-way hash) of the operating system software to be booted, stored in a predetermined location on the hard disk, and compares it with the lists of acceptable digests stored on the user's floppy disk. If the value matches one of those on the floppy disk, the name associated with that digest on the floppy disk is displayed on the screen and the user is asked whether he wants to run with this system. Alternate embodiments are envisioned wherein the user is also asked, if he desires to run with the displayed operating system, in what role he wants to run the operating system. The use of roles in system security is discussed in detail in the above referenced co-pending applications which are hereby incorporated by reference. In this embodiment, the user—in addition to noting whether he wants to run with the displayed operating system—responds with a role name (or a default may be selected that is read from the floppy).

If the message digest of the operating software on the disk does not match one on the user's floppy disk, the user is asked if he wants to run the "unauthenticated operating system" and, if so, in what role. This step of the login procedure makes use of the fact that if an operating system has been infiltrated by a trojan horse or other malicious software, it is likely to have a message digest with a different value than that of the non-affected operating system. By comparing the message digest of the operating system on the personal computer's hard disk with the message digest for a known valid operating system, it is possible to determine whether the operating system on the personal computer's hard disk differs from the known valid operating system. If so, the user is informed and put on notice that the operating system may be partially malicious.

4.2(f) verification of the User's Password

Once the login software has determined whether the operating system on the hard disk is authenticated and so informed the user, it then checks to see if the slow-hash of the user's password has been completed. If so, the login software tries to decrypt the user's encrypted long term secret (the user's private key) using the password slow hash as a key. If the decryption fails, the "password failure count" on the user's floppy disk is checked. If it exceeds a certain number (e.g., 10 as in 4.2(c)), the login software erases the user's encrypted private key from the disk, clears the password from memory, tells the user that the password failure count has been exceeded, and tells him that he must reinitialize the disk. If not, the user is again prompted to enter his password.

If the decryption succeeds, the password failure count on the user's floppy is zeroed out. The successful decryption signifies that the human user has been "authenticated" and that he is who he says he is. Additional information may then be read from the user's floppy and the user is instructed to remove the floppy from the active drive.

4.2(g) Generation of Session Keys and Delegation Certificate

Once the user has been authenticated and the floppy removed, the login software then generates a temporary RSA public-private key pair, referred to as a "session key" and digitally signs a "delegation certificate" using the user's decrypted secret delegating authority for the personal computer to speak for the user. The delegation certificate contains the public component of the session key, the user's role name (if needed), the name of the computing system (if known), the current time, and a validity period indicating that the delegation certificate is only valid for a limited amount of time. The use of the session keys and delegation certificates is further discussed in the above referenced co-pending patent applications.

After generating the session keys and the delegation certificate, the login software then erases the copy of the user's long term secret (his private key) from the personal computer's memory, leaving available the delegation certificate and the public and private session key, and runs the booted operating system software from the personal computer's hard disk. The operating system then boots normally and once in operation it uses the private session key and the delegation certificate to prove to remote servers that it has been authorized by the human user to act in a certain role for a certain period of time. From this point on the operation of the personal computer is essentially the same as a login node in a secure distributed system such as that described in the above referenced copending patent applications.

4.2(h) Alternate Embodiments

Alternate embodiments of the present invention are envisioned where in the list of acceptable operating systems is not maintained on the user's floppy disk. In this embodiment, the personal computer's hard disk would contain a certificate, signed by the user's certifying authority (whose public key is on the floppy), binding a system with a given message digest to a particular name. This embodiment is beneficial in that it does not require the personal computer's hard disk to be customized by each certifying authority.

4.3 Protection of the User's Floppy Disk from Theft

Because the user's long term secret (private key) is encrypted under a password which is only known to the user, the user's floppy disk is reasonably safe from theft. However, someone who steals a user's floppy disk could read out the information and continuously guess passwords until he gets the right answer. While this threat cannot be entirely be prevented, the present invention makes the attacker's effort more difficult through the use of three distinct methods.

4.3(a) Copy Protection of the Encrypted Long Term Secret

In the present invention, the user's encryption secret is stored on the floppy disk in such a manner that it cannot be casually copied by standard disk copy utilities and is concealed in a way that makes finding it difficult even if copied. If the disk is successfully copied, the login software detects that fact and refuses to run. Several copy protection schemes for performing the above described function are known in the art and may be used to prevent copying of the user's floppy disk.

4.3(b) The Use of the Slow Hash

Another way theft protection is enhanced in the present invention is through the use of the "slow hash" procedure. In the present invention, the slow hash procedure is selected so that the calculation of the slow hash of the entered password is very slow, for example ten seconds on a fast personal computer. This length of time limits the rate of password guessing for attackers without very powerful processors. The lengthy delay in hashing the entered password does not adversely affect the performance of the login software because the hash is computed in the background while the other interaction described above (e.g., time check, operating system check) are in progress.

4.3(c) Maintaining a Password Failure Count

A third method for protecting the floppy disk from theft in the present invention is the maintenance of a count of the number of consecutive wrong guesses. As discussed above, the count of wrong guesses—attempted legitimately by loading the floppy and running it normally—is stored on the floppy and the secret on the floppy is destroyed after a certain number of wrong guesses.

We claim as our invention:

1. A method for authenticating a user possessing a storage medium for a computing machine having memory, the storage medium tangibly embodying machine executable instructions, a password for the user, and an encrypted long-term secret for the user, the method comprising the steps of:
   (a) receiving from the user the storage medium and booting the computing machine from machine executable instructions thereon;
   (b) receiving from the user a password;
   (c) initiating a one-way hash of the password according to machine executable instructions embodied on the storage medium; and
   (d) decrypting the user's encrypted long-term secrete using the hashed password as an decryption key thereby authenticating the user.

2. The method of claim 1 wherein the storage medium is received by a powered down computing machine.

3. The method of claim 1 further comprising the step of:
   (a) determining whether the user's storage medium is write protected; and
   (b) if so, clearing the password from the computing machine's memory, terminating the hash of the password, and halting the computing machine's operations.

4. The method of claim 1 further comprising the step of writing to the user's storage medium the number of passwords entered.

5. The method of claim 4 further including the step of halting the computing machine's operations when the number of passwords entered exceeds a preselected number.

6. The method of claim 1 wherein the computing machine's memory contains an operating system and the user's storage medium contains a list of acceptable values representing acceptable operating system files, the method further comprising the steps of:
   (a) computing a value as a specified function of the operating system file of the computing machine;
   (b) comparing the computed value to the list of acceptable values; and
   (c) advising the user if the calculated value does not match any of the values on the list of values representing acceptable operating systems.

7. The method of any one of claims 1-6 wherein the storage medium is a floppy disk.

8. A security device for authenticating a user on a computer, the security device comprising a machine-readable storage medium on which is recorded:
   (a) a machine readable embodiment of the user's long term private encryption key, wherein the private encryption key is encrypted under a key consisting of a slow hash of the user's password;
   (b) a first group of trusted machine executable instructions for carrying out cryptographic calculations; and
   (c) a second group of trusted machine executable instructions for performing a slow hash of received passwords.

9. The security device of claim 8 further comprising a machine readable representation of the public key of the user's certifying authority.

10. The security device of claim 8 further comprising a machine readable representation of the time of the user's last login.

11. The security device of claim 8 further comprising a machine readable representation of the number of incorrect passwords entered.

12. The security device of claim 8 further comprising a machine readable representation of a list of names and message digests of acceptable operating system images which the user is willing to boot the computer with.

13. The security device of claim 8 wherein the security device is a floppy disk.

14. A security device for authenticating a user on a computer, the user having a public and private key and a certifying authority, comprising a floppy disk containing a machine readable representation of:
(a) the user's long term secret, a private key encrypted under a key consisting of a slow hash of a password known only to the user;
(b) the public key of the user's certifying authority;
(c) the time of the user's last login;
(d) the number of incorrect passwords entered;
(e) a first machine executable trusted program that can carry out cryptographic calculations and authentications;
(f) a second machine executable trusted program that can carry out a slow hash of a password and a trusted message program; and
(g) a list of names and message digests of acceptable operating system images with which the user is willing to boot the personal computer.

* * * * *